United States Patent
Radi et al.

(10) Patent No.: US 7,590,072 B2
(45) Date of Patent: Sep. 15, 2009

(54) INTERWORKING NETWORK MAPS OF NETWORK MANAGEMENT AND ELEMENT MANAGEMENT SYSTEMS

(75) Inventors: Tarek Radi, Kanata (CA); Chadie Ghadie, Nepean (CA)

(73) Assignee: Alcatel Lucent, Paris (FR)

( * ) Notice: Subject to any disclaimer, the term of this patent is extended or adjusted under 35 U.S.C. 154(b) by 807 days.

(21) Appl. No.: 10/798,412

(22) Filed: Mar. 12, 2004

(65) Prior Publication Data

US 2005/0201299 A1 Sep. 15, 2005

(51) Int. Cl.
*H04L 12/28* (2006.01)

(52) U.S. Cl. ............... 370/254; 370/252; 370/493; 370/494; 370/328; 370/386; 709/220; 709/221; 709/222; 709/223; 709/224; 709/226

(58) Field of Classification Search ......... 370/241, 370/352, 357, 400, 254, 252, 493, 494, 328, 370/386; 379/201.01, 201.12; 709/223, 709/227, 224, 226, 220, 221, 222; 714/43, 714/44, 47

See application file for complete search history.

(56) References Cited

U.S. PATENT DOCUMENTS

| | | | | |
|---|---|---|---|---|
| 6,529,938 B1 * | 3/2003 | Cochran et al. | ............ | 709/203 |
| 6,564,341 B1 * | 5/2003 | Sundaram et al. | ............ | 714/43 |
| 6,721,735 B1 * | 4/2004 | Lee | ............ | 707/5 |
| 7,065,572 B1 * | 6/2006 | Mansingh et al. | ............ | 709/223 |
| 7,092,364 B1 * | 8/2006 | Franklin et al. | ............ | 370/252 |
| 7,188,160 B2 * | 3/2007 | Champagne et al. | ............ | 709/220 |
| 7,246,354 B1 * | 7/2007 | Antony et al. | ............ | 718/101 |
| 7,515,550 B2 * | 4/2009 | Franklin et al. | ............ | 370/252 |
| 7,522,539 B2 * | 4/2009 | Nagasawa | ............ | 370/254 |
| 2002/0064149 A1 * | 5/2002 | Elliott et al. | ............ | 370/352 |
| 2002/0116485 A1 | 8/2002 | Black et al. | | |
| 2003/0012142 A1 * | 1/2003 | Nagahama | ............ | 370/250 |
| 2003/0101251 A1 | 5/2003 | Low | | |
| 2003/0103077 A1 | 6/2003 | Despotidis et al. | | |
| 2003/0133556 A1 * | 7/2003 | Naik et al. | ............ | 379/201.12 |
| 2003/0140132 A1 | 7/2003 | Champagne et al. | | |
| 2004/0030780 A1 * | 2/2004 | Walters | ............ | 709/225 |
| 2004/0031059 A1 * | 2/2004 | Bialk et al. | ............ | 725/129 |
| 2005/0013259 A1 * | 1/2005 | Papoushado et al. | ............ | 370/254 |
| 2005/0030907 A1 * | 2/2005 | Lou et al. | ............ | 370/254 |
| 2005/0108379 A1 * | 5/2005 | Gray et al. | ............ | 709/223 |
| 2005/0108387 A1 * | 5/2005 | Li et al. | ............ | 709/224 |
| 2005/0201299 A1 * | 9/2005 | Radi et al. | ............ | 370/254 |

\* cited by examiner

*Primary Examiner*—Aung S Moe
*Assistant Examiner*—Christopher P Grey

(57) ABSTRACT

In a communication network, the network management system NMS keeps one or more element management system EMS in synchronization of network topology changes using requests that are automatically generated or manually requested and then sent from the NMS to the affected EMS(s) whenever a node topology change is made at the NMS. Examples of changes are node creation, node move, node group move, node group renaming, etc. As the changes are completed in the EMS topology database, the EMS sends acknowledgments of the request to the NMS. This functionality requires verification of the validity of the request for that specific EMS, before the change is implemented at the NMS.

26 Claims, 5 Drawing Sheets

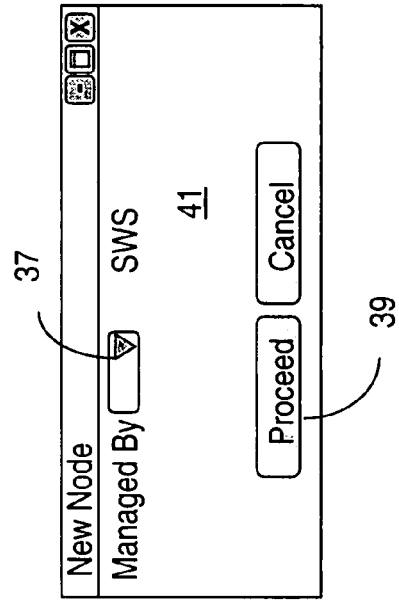
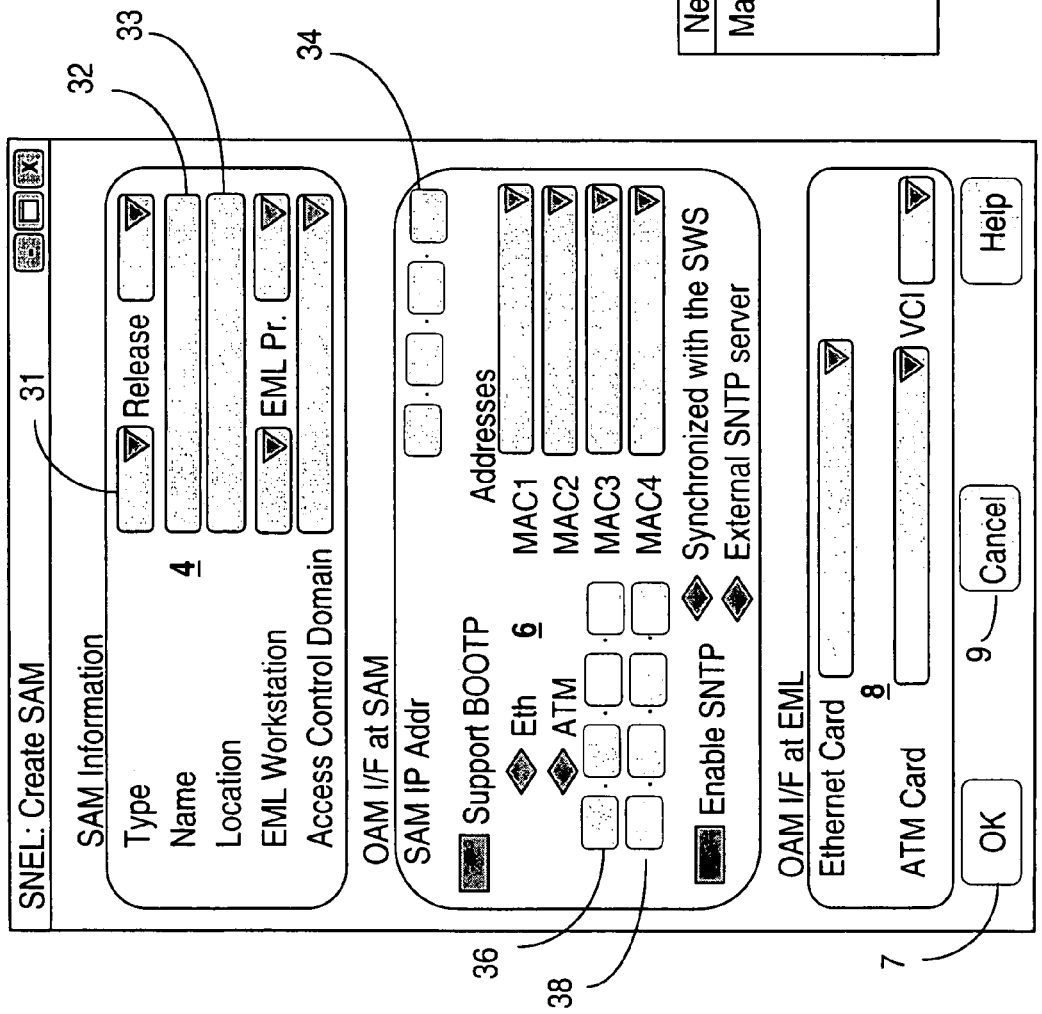

INTERWORKING NETWORK MAPS OF NETWORK MANAGEMENT AND ELEMENT MANAGEMENT SYSTEMS

FIELD OF THE INVENTION

The invention is directed to communication networks and in particular to synchronizing the network map of the network management system (NMS) with that of an element management system (EMS).

BACKGROUND OF THE INVENTION

Communication networks are comprised of heterogeneous network elements (NE) such as telecommunication terminals, switches, routers, amplifiers, etc. interconnected in various configurations by physical hardware connections, and the software used to send, receive and route the information between these NEs. Network elements are each a complex programmable system, including programmable subsystems and local memory for storing the respective programs and maintaining records of the operating history.

The current trend to integrate smaller networks of various technologies into global networks that extend over tens of thousands of miles, demands reliable and sophisticated tools for monitoring and controlling operation of a very large number of network elements, which are spread over a large geographical area. In addition to the challenge posed by the size of the network, topology of a telecommunications network is continually changing as equipment is added, removed, relocated and/or upgraded. Still further, network customers demand fast response to any service request: a corporate user of bandwidth which requests additional capacity will be severely hampered if the response is not prompt.

Driven by the need to develop and deploy highly scalable new services in a rapid and cost-effective manner, the network management systems (NMS) are rapidly evolving towards highly distributed, multi-vendor systems with open interfaces that enable applications that are independent from the underlying transport technologies. A NMS receives real time information about status, operation and performance of the NEs and systemizes this knowledge such that communication problems can be detected, isolated and corrected, either automatically or by the maintenance personnel. A NMS is provided with a graphical user interface (GUI) that enables an operator to input commands and to interact with various network entities.

The NMS maintains a network map (also known as network view or network topology view) with hierarchical information about network topology, i.e. the equipment and connectivity data. Such maps show the NE location in the network indicating the node of residency, and eventually a node group to which the node belongs. A node group is a logical grouping of nodes and NE's, and may also include other node groups. This topological information changes due to network configuration changes; whenever the network topology changes, the NMS map must be modified accordingly to accommodate this change.

To keep pace with the ever-increasing size of networks, a NMS communicates with a plurality of element management systems (EMS). An EMS is similar in role to the NMS, except that it manages NE of a specific type, from a specific network provider or vendor. EMS's also have an important role in configuring, provisioning, operating and monitoring the network elements they manage.

An EMS may also maintain a map with hierarchical information about the topology of the sub-network it controls. As the number of EMS's in a network increases, it is a challenge to keep the NMS and EMS's in synchronization regarding the network topology.

In general, the alignment between the EMS and NMS maps is performed manually. This is however extremely time-consuming and cumbersome, not to mention error-prone for even the smallest changes or reorganizations in the hierarchy, or the naming of the node groups in the hierarchy. For example, if each node's location in the node hierarchy on the NMS map is used to generate the location identifier of that node on the EMS map, then changing a group name is a complex task because a group may include dozen of network elements, and the name change requires changing the EMS location identifier of each NE in the group.

Map alignment is particularly challenging for EMS's that manage subscriber access systems; such an EMS can manage hundreds of subscriber access multiplexers (SAM). A SAM multiplexes the data received from the user ports into the network. Return data from the network is demultiplexed by the SAM for communication to the clients via the respective ports. The SAM also enables scaling-up the number of users by gradually populating unused ports. As an example, a DSL (digital subscriber line) communication network uses a DSL access multiplexer (DSLAM), which is typically located at a central office of the telephone network and includes multiple DSL modem ports for connecting multiple client modems.

U.S. Patent Application 2003/0140132 A1 (Champagne et al.) published on Jul. 24, 2003 describes a method of updating network device information and synchronizing the NMS database with the configuration information maintained at a network device. The synchronization process can be initiated in the NMS in response to input from a network management client, and can also be initiated via a message from the network device at power-up or upon insertion or removal of a circuit card. As a result, the NMS sends an upload configuration request to the network device, and the network device responds by transferring a configuration file containing the current configuration information. However, this patent application does not disclose synchronization of NMS and EMS network views.

SUMMARY OF THE INVENTION

It is an object of the invention to provide a method for interworking NMS and EMS network view maps that alleviates totally or in part the drawbacks of the such existent interworking methods.

It is another object of the invention to provide a method for automatically synchronizing the NMS and EMS databases whenever a network topology change is made.

Accordingly, the invention is directed to a method of synchronizing a network management system (NMS) and element management system (EMS) topology maps in a communication network. The method comprises receiving at the NMS a user request for a hierarchy altering operation, the user request comprising topology change data; verifying validity of the user request, and, whenever the user request is valid: altering the NMS network map according to the topology change data in the user request; automatically sending, from the NMS to the EMS, a change request comprising the topology change data; and updating the EMS map according to the change request.

In another aspect, the method according to the invention comprises: receiving at the EMS a user request for a hierarchy altering operation, the user request comprising topology change data pertinent to a network entity; automatically sending, from the EMS to the NMS, a change request comprising topology change data; at the NMS, verifying validity of the user request; and altering the NMS network map according to the topology change data in the user request whenever the user request is valid.

Still further, the invention provides a NMS for a communication network, comprising: a network topology map comprising all network entities in the communication network and hierarchical information on location of the network entities; a user interface for enabling the NMS to receive a user request comprising topology change data pertaining to a specified network entity; means for verifying validity of the user request; means for changing the NMS map according to the topology change data whenever the user request is valid; and means for generating from the user request a change request comprising the topology change data and automatically sending the change request to an EMS affected by the user request.

In addition, the invention provides an element management system (EMS) for a communication network monitored and controlled from a network management system (NMS) maintaining a network topology map with all network entities in the communication network and with hierarchical information on location of the network entities. The EMS comprises an EMS topology map including a subset of network entities and hierarchical information on location of the network entities in the subset; means for receiving from the NMS a change request comprising topology change data; and means for changing the EMS map according to the topology change data.

Advantageously, the invention enables improved operator efficiency at managing a communication network, particularly at keeping the NMS and EMS in synchronization.

In the case of an error causing the NMS and EMS not to synchronize, the invention allows the user to manually reissue the synchronization request at any time for one node (the selected node), all nodes that are directly or indirectly part of a node group, or all nodes in the entire network.

BRIEF DESCRIPTION OF THE DRAWINGS

The foregoing and other objects, features and advantages of the invention will be apparent from the following more particular description of the preferred embodiments, as illustrated in the appended drawings, where:

FIG. 1b illustrates a NMS map for the example of FIG. 1a;

FIG. 1c illustrates an EMS map for the example of FIG. 1a;

FIG. 2b illustrates an example of the information to be entered by a network operator for creation of a network element;

FIG. 2c shows a new node creation form; and

DETAILED DESCRIPTION

Figure 1A:
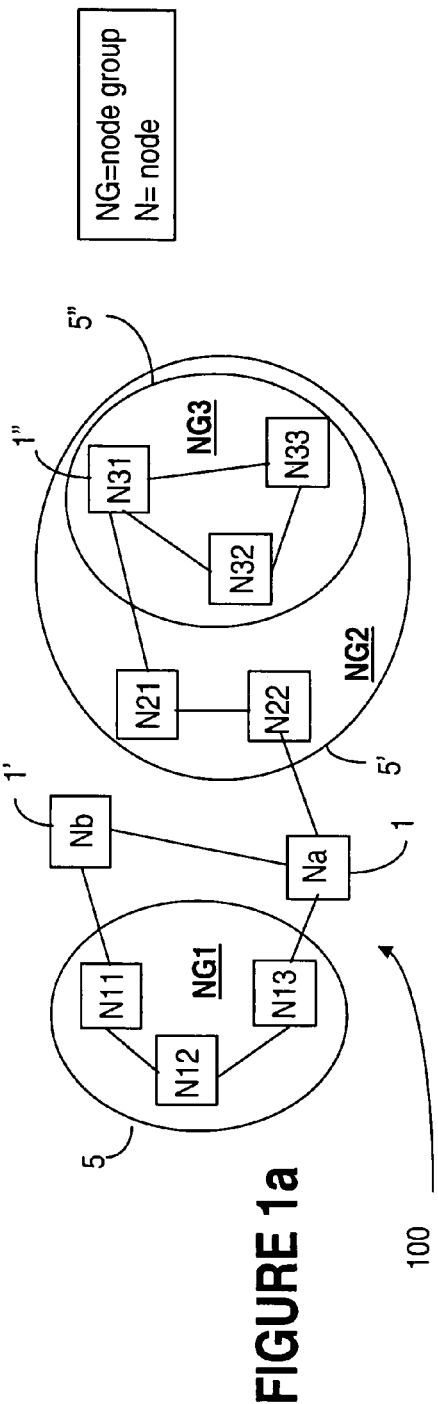
FIG. 1a illustrates a communication network, showing an example of network nodes grouping.

FIG. 1a shows an example of a communication network 100, illustrating a possible hierarchical grouping of the network nodes. In this example, network 100 includes nodes 1 (Na) and 1' (Nb) and two node groups NG1, denoted with 5 and NG2, denoted with 5'. As indicated above, the nodes are grouped based on physical location or logical ordering, according to organizational rules used in the respective network. NG1 in this example includes nodes N11, N12 and N13. Nodes N21 and N22 are groups along with a node group NG3, denoted with 5", into node group NG2. In turn, NG3 contains nodes N31, N32 and N33.

Figure 1B:
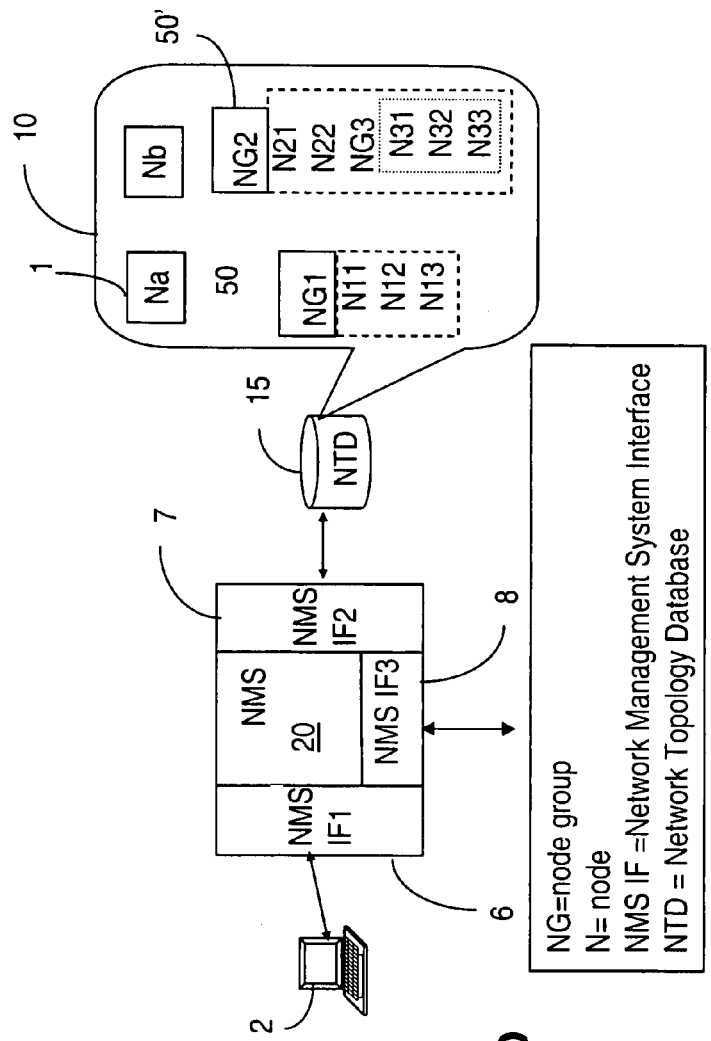

FIG. 1b shows a data terminal (a workstation) 2, with the network management system NMS 20 which enables network operator access for transmitting commands to the NMS and receiving information about operation of the network. The NMS 20 has a user interface 6 which performs well known functions, and which has additional functionality according to the invention. A graphical user interface GUI on terminal 2 enables displaying various network maps on the screen of terminal 2, such as an entire network map, or parts of the network, at various granularities, as requested. Interface 6 verifies validity of any user request for a hierarchy altering operation of the network map 10, by verifying the correctness of the topology change data in the user request, as discussed later.

NMS 20 maintains an updated view of the network it manages, as shown at 10 on FIG. 1b, and a second interface 7 that enables changes to the map. That is, NMS 20 maintains a network topology database 15, which keeps the hierarchical information about the network node groups, nodes and network elements. An entire network map 10 shows only the managed objects at the top level of the hierarchy on network 100 of FIG. 1a, i.e. nodes Na, Nb and groups NG1 and NG2. Maps for each group at the immediately next level are shown in coarse dotted lines under the respective node group, and maps at the next level are shown in fine dotted lines under the respective node group. Maps of finer granularity such as maps with the network elements at a certain node and their connectivity can also be viewed.

Still further, the NMS 20 communicates with one or more element management systems EMS using a third interface 8. Interface 8 performs (in addition to the traditional mode of operation) new functions according to the invention. This NMS interface 8 identifies the EMS(s) affected by the user request for the respective hierarchy changing operation. Also, interface 8 transmits automatically a change request to the affected NMS for user changes to the portion of the map managed by the EMS, according to the topology change operation.

Figure 1C:
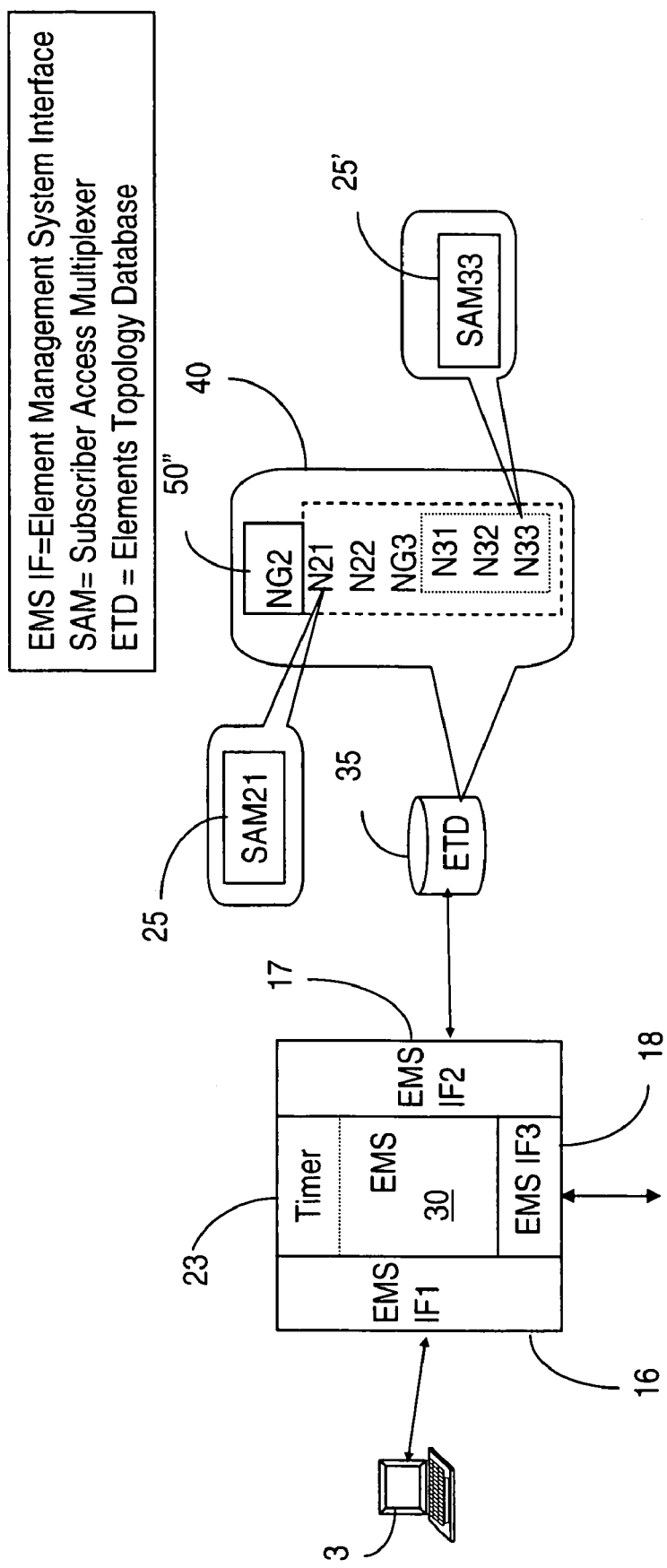

FIG. 1c shows a data terminal (a workstation) 3 with an element management system EMS 30. As indicated above, an EMS manages NE's of a similar type, and it may also maintain a topology database ETD 35 with hierarchical information about the subset of network elements in the sub-network it controls. As well known, EMS 30 may be provided with a user interface 16 for enabling communication with the network administrator using the GUI on terminal 3. According to the invention, this first EMS interface 16 also enables the EMS to receive a user request with topology change data pertaining to a specified network entity in the sub-network monitored and controlled by the respective EMS. In addition, interface 16 disables any subsequent user requests involving topology changes for the same network entity received on terminal 3, for enabling user request pertinent to said network entity from one localized place.

It is to be noted that FIG. 1c shows a simplified scenario with one EMS managing all nodes of NG2. As indicated above, an EMS manages a subset of the network, and an NSM manages one or more EMS's. In the example of FIG. 1c, all nodes in NG1 are managed by the same EMS 30. Other scenarios may also be envisaged. For example, one EMS could manage nodes N21 and N31, and a second EMS could manage nodes N22 and N33. In this scenario, N32 can be managed directly by the NMS 20. It is to be noted interface 8 of the NMS 20 shown in FIG. 1b is responsible with identifying all affected EMS's due to user operation and then updating each accordingly.

Network operators may also access the EMS database 35 to view a map 40 with the topology of the sub-network of interest on the GUI over a second EMS interface 17. A third EMS interface 18 enables communication with the NMS 20; pertinent to this invention is receiving from the NMS any change request affecting map 40, and transmitting automatically a user request for a hierarchy changing operation, if input from this EMS.

Let us assume that for the example of FIG. 1a, EMS 30 manages the sub-network of node group 5', and that nodes N21 and N33 are access nodes. Access nodes are equipped with a subscriber access multiplexer (SAM) network element 25, which could be for example an ATM SAM (ASAM), used for enabling access to a plurality of users to communication network 100. In this example, map 40 of EMS 30 shows the SAM at nodes N21 and N33, while also providing the information that the node N33 is in node group 5". The workstation 3 with EMS 30 is also referred to as a SWS (SAM working station).

EMS 30 is also equipped optionally with means for cyclically checking the state of the EMS. Thus, if a change request is received from the NMS and the EMS is temporarily in an 'off state', the change request is stored and the EMS status is cyclically checked. Once EMS 30 is back 'on', the change request is provided to the second EMS interface 17 and map 40 is altered accordingly.

According to the invention, the NMS disseminates all network topology changes to the respective EMS's for keeping the network management system map 10 synchronized with the element management systems maps 40. To this end, the NMS 20 sends automatic change requests to the EMS's whenever a network topology change is made at the NMS. As the changes are completed in the EMS's topology database, the EMS sends acknowledgements of the requests to the NMS.

Examples of changes are equipment addition, upgrades, relocation and removal. Also, node group name changes are considered a change in the network topology, since these need also to be propagated to the EMS's. The above changes refer to node groups, nodes, and network elements. Automation of this process is particularly beneficial in the case of SAM nodes; a SWS may manage for example hundreds of subscriber access multiplexers, and manual updates are time-consuming, expensive and error-prone.

Also according to the invention, any topological changes made on the EMS side, such as addition of a SAM, is automatically propagated to the NMS. Once a SAM is on the EMS and NMS maps, the EMS prevents the administrator from making any topological changes to that SAM. The NMS becomes responsible for any future changes, forcing the administrator to do the changes from one localized place.

Also, the invention provides more than just automating the EMS-NMS map synchronization. The challenging part of EMS-NMS map synchronization is for the NMS to verify that the request is valid for the EMS, before allowing the user to perform the change operation on the NMS map.

Figure 2A:
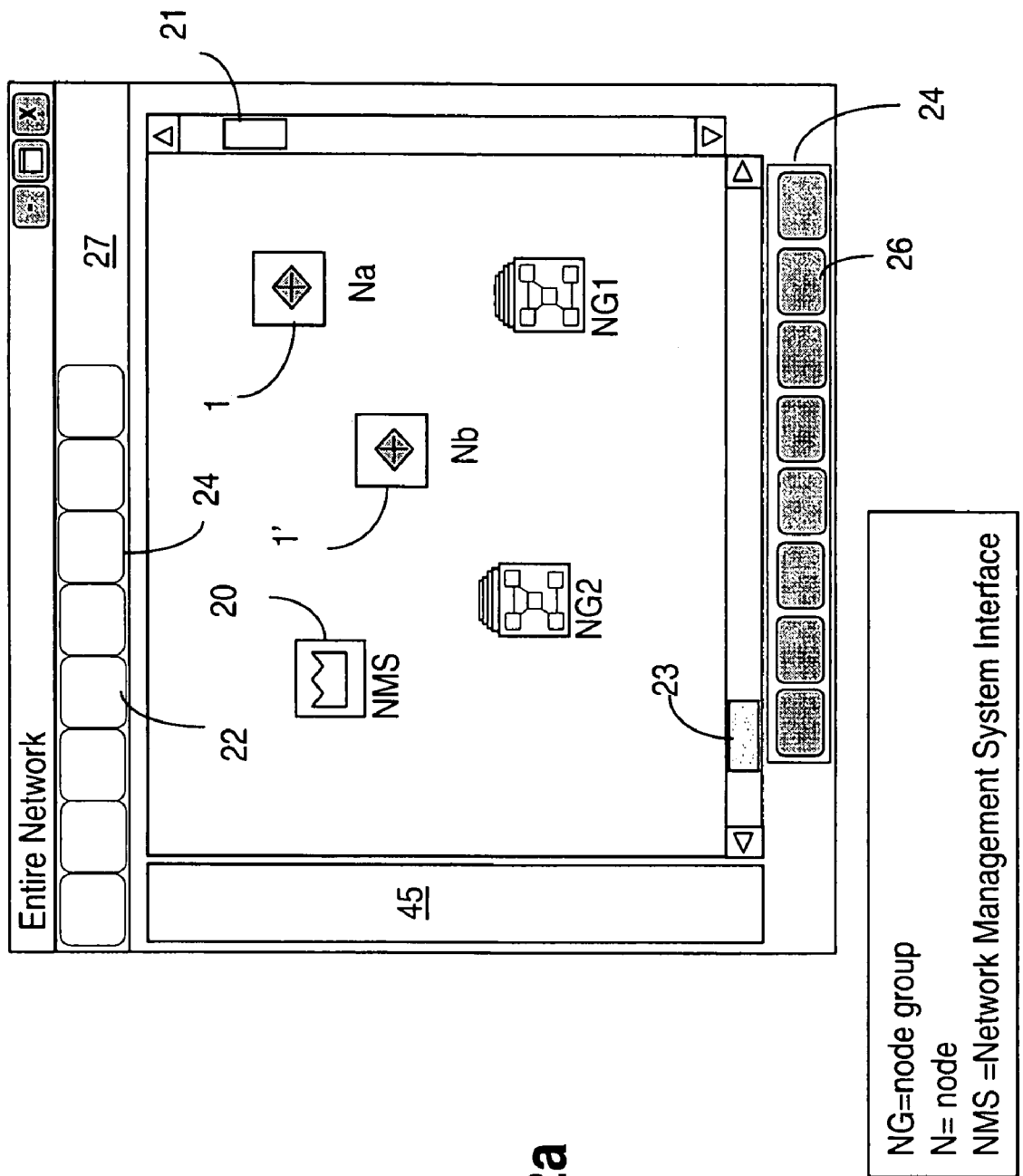
FIG. 2a shows an example of a network manager entire network map.

FIG. 2a shows an example of a network manager entire network map 10 as seen on the screen of workstation 2, illustrating nodes 1, 1' (e.g. Na and Nb for the example of FIG. 1a), and node groups NG1 and NG2. Scroll bars 21, 23 may be provided as well known to enable viewing of all entities at this level (entire network level). A control toolbar 27 with well-known pull down menus such as "File", "Edit", "View", "Tools", "Window, "Help" is also provided. Additional pull down menus "Create" shown at 22, and "List" shown at 24, are provided on toolbar 27 for enabling the operator to effect the topology changes on the NMS map. The "Create" button 22 will allow the user to add new equipment to the map, and the "List" button 24 allows the user to view all equipment matching a particular listing criteria.

On the bottom of the screen, a map toolbar 24 with buttons 26 enables activating various commands on the respective map 10. Tool buttons allow the user to manipulate the view of the network map with operations such as Zoom In/Out, Change the selected object, View the color map and Traverse upwards the node group hierarchy.

To the right of the screen, a field 45 may be provided for showing the hierarchical structure of the network 100, for enabling the user to select the display of the network entities at another level of interest. For the above example of FIG. 1a, it could show nodes Na, Nb and node groups NG1 and NG2 at the entire network level. If desired, the nodes of node group NG1 (i.e. nodes N11, N12 and N13) and/or the nodes of node group NG2 (i.e. N21, N22 and NG3) may be viewed under the respective group. At the next level, nodes N31, N32 and N33 may be viewed under node group NG3, etc.

FIG. 2b illustrates an example of the fields of the SAM workstation network element list (SNEL) used for creating a network element, and in particular a SAM 25. It is to be understood that the drawing illustrates one preferred embodiment, but other arrangements of the SNEL may also be envisaged. For the general case, the EMS network element list is called ENEL. The SNEL includes in this example three main fields, namely field 4 with SAM information, field 6 with information pertaining to the OAM (operation administration and maintenance) interface at SAM, and field 8 with data on the OAM interface at element management layer (EML).

Field 4 requires completion/selection of the SAM type 31, name 32, and location 33; information such as release may also be required for fully identifying the NE type. Filed 4 also requires completion of information regarding which component of the current EMS controls the newly created NE, such as EML workstation name, EML process, and access control domain (SWS name).

The OAM interface at SAM field 6 enables assigning an address to the NE being created on the respective network. For example, the IP address of the SAM should be specified at 34. Also, the user can specify whether or not the SAM node once created will be supervised by the EMS or will be unsupervised (an unsupervised SAM node can later be supervised and vise versa). Support for protocols (such as BOOTP and SNTP) can be enabled/disabled in this part of the form. In case the SAM node is managed in a different subnet than the EMS and management messages need to go through another router, the user can specify the IP of that 38 router and the subnet mask 36 to be used.

The OAM interface at EML field 8 requires specification/selection of the Ethernet or ATM host card. An "OK" button 7 is used to confirm completion of NE creation, while a "Cancel" button 9 enables corrections, and the "Help" button launches customer documentation for this form.

FIG. 2c illustrates a SAM creation form 41, entitled "New Node". When the administrator wishes to add a node to the NMS to manage, s/he selects an appropriate location of the node based on the existing node hierarchy and the organization rules used. The administrator then adds this new node at the respective hierarchical level (under a node group or at the entire network level) using map operations enabled on the NMS according to the invention. If an appropriate node group does not exist, the administrator can create it.

SAM creation may be initialized from the NMS 20 with the group hierarchy information as a default value for the location name field 33. A user can create a SWS managed node by first issuing a "New Node" command under "Create" button 22 on the NMS map 10 (see FIG. 2a). The SWS element management system EMS 30 is selected in a "Managed By" field 37 on the form 41. Then, by clicking on the "Proceed" button 39 on the form 41, the SAM creation form shown in FIG. 2b will have the "location" field 33 filed with the respective location information. Thus, if the SAM creation is initialized from the entire network map, field 33 is filed with "/" (root). If, for the example of FIG. 1a, NG3 is contained in NG2, the user invokes the "New Node" command in the map for NG3, then after clicking the "Proceed" button 39, the location field 33 on the SAM creation form in FIG. 2b will be filled with "/Group2/Group3".

If the user wishes to move a node, let's say node Na from the entire network map 10 to the node group NG2/NG3, the EMS list of network elements (ENEL) will show the new location for node Na as "/NG2/NG3" instead of "/". If then the user renames NG2 to NG5, the ENEL maintained by the affected EMS's will show the location name for Na as "/NG5/NG3". If the user then moves NG3 right under the "entire network", the ENEL will show the location name as "/NG3". In essence, the location field will always contain the updates generated from the new group hierarchy on the NMS.

The NMS also enables the operators to create the SAM node into an appropriate node group as a result of the modification of the SAM location from the SWS EMS. In this case, new groups are created automatically if they do not yet exist. Thus, whenever the user creates a new SAM node from an EMS, the group in which the "create SAM" command was launched is used to create the default node location on the map of that EMS. Before saving this form and adding the SAM node to the EMS, the user may change the location if necessary. Once the user clicks on the "save" button 7. The new node location is sent by the EMS to the NMS, and the node is created in the appropriate group. The group hierarchy in which the SAM node is now located will be used to automatically generate the new location and be sent to the SWS EMS.

Once a SAM is created on the EMS, the NMS becomes the master of the nodes location and the EMS 'freezes' the node location on the node configuration form. The only way to change this location is to use the NMS to move the SAM node to another group, or move or rename the node group in which the SAM node exists either directly or indirectly.

Figure 3:
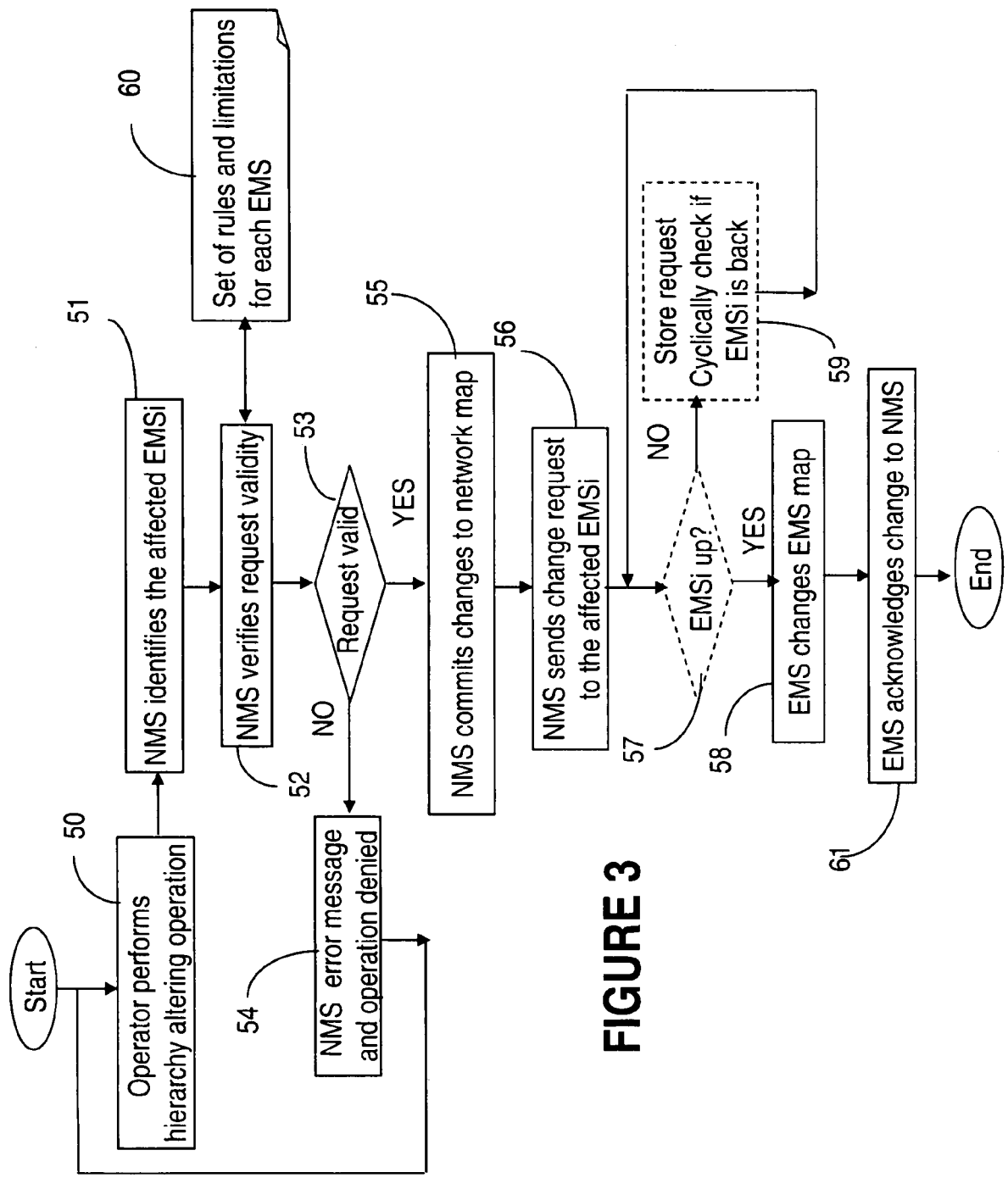
FIG. 3 is a flowchart of the method of synchronizing the NMS and EMS maps according to the invention.

FIG. 3 is a flowchart illustrating the method of synchronizing the NMS and EMS maps according to the invention. In step 50, the operator performs a hierarchy altering operation on the NMS map, using the GUI. As indicated above, the change could be addition, upgrade, relocation or removal of a NE, a node, or a node group. A change may also be a node group name change or a node group relocation. On receipt of the change request, the NMS 20 identifies the nodes affected by the operation, and determines the set of EMS's managing these nodes, denoted with EMSi as shown in step 51. It is to be understood that a change may affect more than one EMS, and as such the maps for each of the affected EMS needs to be updated.

Next, the NMS verifies the validity of the request with respect to each EMS, as shown in step 52 for EMSi. Request validity is verified before sending the request to the EMS's, against a set of rules and limitations 60.

Request validity verification is challenging because each EMS is specifically designed to manage a certain type of NEs, which may each have specific limitations. These limitations may include the allowable format of node names, a specified number of nodes allowed in an EMS span of control, the total length of the location identifier generated from the new SAM's location in the node group hierarchy, etc. Thus, if the user moves an SWS managed node from one group to another, moves a sub-group containing AWS managed nodes from one group to another, or re-names a group containing SWS managed nodes within the group hierarchy, the NMS will check first if the new group hierarchy does not contain any empty group names and that the resulting location identifier meets the other restrictions of that EMS.

If the request is invalid, as shown by branch "No" of decision block 53, a NMS error message appears as a popup error window, and the respective operation is denied, step 54. The error messages may be as detailed as desired. For example, let us say that the user invokes the "New Node" command 26 from a group map with one of the parent groups in the hierarchy containing an empty name and sets the "Managed by" field 37 to SWS. After clicking on the "Proceed" button 39, the NMS will reject the node creation by displaying a popup window saying e.g. "Node creation failed. Enter a group name for one or more node groups to which the node belongs."

The empty name check is applied to all node groups in which the new node is being created (both direct and indirect containment) up to the entire network map. An "OK" button can also be provided on the popup error window, and when the user clicks on it, the popup window could disappear and "New Node" configuration window 41 could still be active.

The check for an empty group name is also performed when renaming a group that contains SWS managed nodes. For example, the user may select to rename NG2. The new group's new name may be empty. However, the NMS will first check to see if an EMS managed SAM exists directly or indirectly in this node group. If it does, then an empty name will not be allowed and a popup window will appear saying e.g.: "The group name cannot be empty. Please re-enter the group name". As in the above example, the popup window has an "OK" button; when the user click on it, the popup window disappears and the original name of NG2 returns, to enable the operator to reselect a valid name. As shown in this example, the EMS enables restriction to naming of node groups, even though the name would have been valid from the perspective of the NMS.

These rules also take into account the syntax and completeness of the request. Example of invalid requests are syntax errors, such as resulting location identifier strings that are longer than permitted for the respective field on the EMS, or that contain characters that are considered invalid by the EMS. Invalid characters are treated in a similar manner.

For example, the NMS blocks creation of a node if one of the groups in the group hierarchy has characters "/" and "\". In this case, these characters are considered valid from the NMS perspective as node group names, yet they are not valid from the EMS perspective; they cannot appear in the location field since these characters are reserved as separators. Thus, if the user invokes the "New Node" command from the NSM and tries to create an SWS managed node in a group map, and that group or any of its parent groups has an invalid name from an EMS perspective, then clicking on the "Proceed" button 39 results in a popup window displaying an error message. The error message could in this case be: "Node creation failed. The group hierarchy for the node cannot contain one or more spaces or special characters (excluding dashes and underscores)." By clicking on the OK button on the popup window, the window will disappear, as well as the "New Node" configuration window. The user will have to rename all of the non-conforming node groups before being able to successfully issue a SAM create request on the EMS from the NMS.

In addition, whenever the change relates to moving a SAM node, or if a node group that contains a SAM node is moved or renamed, all node location rules for the EMS on the respective SWS need to be validated. For example, the length of the new location name for each SAM node that resulted from a change as above should remain less than the maximum admissible number of characters, and must still contain no invalid characters. Thus, simply moving a node or a node group into another level of the network hierarchy would be invalid if the resulting node name string, which comprises the hierarchical location of the node after relocation, is too long.

Since such an ample validation operation may be costly, and could affect the overall performance of NMS operations, an option to disable these checks may also be provided. This will allow the user to decide when to enable the checks for maintaining consistency between the NMS node group hierarchy and the location attribute of the SAM's on the EMS's, and when to disable these.

After all the empty groups are named properly, syntax error corrected and completeness of the request finalized, the user can resume the hierarchy altering operation, step 50.

If all checks pass (i.e. the change request is valid), as shown by branch "Yes" of decision block 53, the NMS changes the network map appropriately, step 55, and the location field 33 is populated with the appropriate (new or modified) location, based on the node group hierarchy from the "entire network map" 10.

Now, the change request is sent to the affected EMSi, as shown in step 56. For example, a user may wish to change the name of node group NG2 shown in FIG. 1a. In the scenario shown in FIG. 1c, where all nodes of the group are managed by one EMS, the name change request is sent to EMS 30. It is to be understood that if more than one EMS is affected by a change request, the NMS sends change request messages to all affected EMS's. For the above example with two EMS's managing the nodes of NG2 (one for nodes N21 and N31, and a second one for nodes N22 and N33), two update requests are sent to the first EMS, for updating nodes N21 and N31, and two other update messages are sent to the second EMS for updating nodes N22 and N33.

In step 58, the EMS effects the change to its map, as discussed above in connection to FIGS. 2a-2c. When the change is completed in the EMS's topology database, the EMS sends acknowledgements of the requests to the NMS, step 61.

Another issue to be considered in the verification step is updating the EMS in real time as the changes are being made. A delayed synchronization mechanism may also be provided optionally, with a view to handle the case when an EMS may be temporarily unreachable or too busy to make network map changes, as shown in dotted lines steps 57-59. In this case, the NMS checks in step 57 if the EMSi is operational. If yes, the change is readily implemented in the EMS map, step 58. If not, step 59, the request is stored and the NMS checks cyclically if EMSi is back.

In another implementation of the invention, the NMS may not check the connection cyclically to the EMS, but provide the user with the ability to manually request an automatic resynchronization of the node group hierarchy of the NMS with the location attribute on the EMS. Such an operation may be applied to the entire network, to a particular SAM node, or to all SAM nodes in a subset of the hierarchy maintained by the NMS (e.g. selecting a node group and issuing that request).

We claim:

1. In a communication network provided with a Network Management System (NMS) maintaining a network topology map and one or more Element Management Systems (EMS) that manage a plurality of network entities each EMS maintaining a respective EMS topology map, a method of synchronizing said network topology map with a respective EMS topology map, comprising:
receiving, at said NMS, a user request for a hierarchy altering operation, said user request comprising topology change data for at least one of said network entities;
verifying validity of said user request with respect to each EMS against a set of rules and limitations associated with said respective EMS, and, after said user request has been validated;
altering said network topology map according to said topology change data in said user request;
automatically sending, from said NMS to said EMS, a change request comprising said topology change data;
updating said EMS topology map according to said change request;
automatically propagating said topology change data from said EMS to said NMS;
preventing an administrator from making any topological changes to an added network entity on said EMS; and
making said NMS responsible for any future topological changes on said EMS.

2. The method of claim 1, further comprising:
sending an acknowledgement from said EMS to said NMS to inform said NMS that said EMS topology map has been updated.

3. The method of claim 1, wherein said topology change data refers to at least one of adding, upgrading, moving, removing, and renaming at least one of said network entities.

4. The method of claim 3, wherein said network entity is selected from the group consisting of a node group, a network node, and a network element.

5. The method of claim 1, further comprising:
providing an error message whenever said user request is invalid.

6. The method of claim 1, further comprising:
checking the syntax and the completeness of said user request.

7. The method of claim 1, further comprising:
checking location identification data in said user request.

8. The method of claim 7, wherein said location identification data provide the hierarchical location of at least one of said network entities to which said topology change data are applied.

9. The method of claim 5, wherein said error message specifies that said user request includes invalid characters.

10. The method of claim 5, wherein said error message specifies that said user request includes incorrect location identification data.

11. The method of claim 10, wherein said incorrect location identification data comprise at least one of an incorrect network entity name, an incorrect specification of at least one of said network entities, and a missing name for at least one of said network entities.

12. The method of claim 1, further comprising:
identifying at said NMS which EMS is affected by said user request, for selectively sending said change request to said affected EMS managing one or more affected network elements.

13. The method of claim 1, further comprising:
cyclically checking the state of said EMS,
storing said change request whenever said EMS is temporarily in an 'off state', and
providing said change request to said EMS when said EMS is back in an 'on state'.

14. In a communication network provided with a Network Management System (NMS) maintaining a network topology map and one or more Element Management Systems (EMS) that manage a plurality of network entities, each maintaining a respective EMS topology map, a method of synchronizing said network topology map with an EMS topology map, comprising the following steps:
receiving, at said EMS, a user request for a hierarchy altering operation, said user request comprising topology change data pertinent to at least one of said network entities;
automatically sending, from said EMS to said NMS, a change request comprising topology change data for at least one of said network entities;
at said NMS, verifying validity of said user request with respect to each EMS against a set of rules and limitations associated with said respective EMS;
after said user request has been validated, altering said network topology map according to said topology change data in said user request;
automatically propagating topological changes from said EMS to said NMS, and
preventing an administrator from making any topological changes to an added network entity on said EMS; and making said NMS responsible for any future topological changes on said EMS.

15. The method of claim 14, wherein said EMS disables any subsequent user requests involving said topology change data from said EMS, for enabling user request pertinent to said network entity from one localized place.

16. A Network Management System (NMS) for a communication network having a plurality of Element Management Systems (EMS) that manage a plurality of network entities, comprising:
a network topology map comprising all of said network entities in said communication network and hierarchical information on locations of said network entities;
a user interface for enabling said NMS to receive a user request comprising topology change data pertaining to a specified network entity;
means for verifying validity of said user request relative to each EMS against a set of rules and limitations associated with said respective EMS;
means for changing said network topology map according to said topology change data after said user request has been validated;
means for generating from said user request a change request comprising said topology change data and automatically sending said change request to an Element Management System (EMS) affected by said user request;
means for automatically propagating said topology change data from said EMS to said NMS;
means for preventing an administrator from making any topological changes to an added network entity on said EMS; and
means for making said NMS responsible for any future topological changes on said EMS.

17. The NMS of claim 16, wherein said hierarchical information on location of said network entities provides a location of a network element in at least one of the entire network, in a node group, and a network node.

18. The NMS of claim 16, wherein said network topology map is stored in a NMS database.

19. The NMS of claim 16, further comprising:
means for identifying said EMS affected by said user request.

20. The NMS of claim 16, wherein said means for verifying comprises a list of syntax errors, invalid characters, and empty node group names.

21. In a communication network provided with a Network Management System (NMS) maintaining a network topology map with all network entities in said communication network and with hierarchical information on locations of said network entities, at least one Element Management System (EMS), each said EMS managing a plurality of network entities and being monitored and controlled by said NMS, comprising:
an EMS topology map including a subset of said network entities and hierarchical information on location of said network entities in said subset;
means for receiving, from said NMS, a change request comprising topology change data for at least one of said network entities;
means for verifying validity of a user request with respect to each EMS against a set of rules and limitations associated with said respective EMS before sending the user request to each EMS;
means for changing said EMS topology map according to said topology change data;
means for automatically propagating said topology change data from said EMS to said NMS;
means for preventing an administrator from making any topological changes to an added network entity on said EMS; and
means for making said NMS responsible for any future topological changes on said EMS.

22. The EMS of claim 21, further comprising:
a user interface for enabling said EMS to receive a user request comprising said topology change data pertaining to a specified network entity in said subset of network entities.

23. The EMS of claim 22, further comprising:
means for automatically sending said user request to NMS.

24. The EMS of claim 22, further comprising:
means for disabling any subsequent user requests involving said topology change data from said EMS and, for enabling said user request pertaining to said specified network entity from one localized place.

25. The EMS of claim 21, further comprising:
means for cyclically checking the state of said EMS, storing said change request whenever said EMS is temporarily in an 'off state', and providing said change request to said EMS when said EMS is back in an 'on state'.

26. In a communication network provided with a Network Management System (NMS) maintaining a network topology map and managing a plurality of Element Management Systems (EMS), each said EMS managing a plurality of network entities and maintaining a respective EMS topology map, a method of resynchronizing said EMS topology map with said network topology map, comprising:
receiving, at said NMS, a user request for a resynchronization of said network topology map with said EMS topology map;
verifying validity of said user request with respect to each EMS against a set of rules and limitations associated with said respective EMS; and
after said user request has been validated;
automatically sending, from said NMS to each said EMS affected by said request, updating topology data relevant to at least one of said network entities managed by said affected EMS;
updating each said EMS topology map of each said affected EMS according to said updating topology data;
automatically propagating said updated topology data from said EMS to said NMS;
preventing an administrator from making any topological changes to an added SAM on said EMS; and
making said NMS responsible for any future topological changes to the added SAM on said EMS.

\* \* \* \* \*

UNITED STATES PATENT AND TRADEMARK OFFICE
CERTIFICATE OF CORRECTION

| | | |
|---|---|---|
| PATENT NO. | : 7,590,072 B2 | Page 1 of 1 |
| APPLICATION NO. | : 10/798412 | |
| DATED | : September 15, 2009 | |
| INVENTOR(S) | : Tarek Radi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,146 days.

Signed and Sealed this

Eleventh Day of January, 2011

David J. Kappos
*Director of the United States Patent and Trademark Office*